(12) United States Patent
Zahirovic

(10) Patent No.: US 12,208,379 B2
(45) Date of Patent: Jan. 28, 2025

(54) MULTIPLE-BED CATALYTIC REACTOR COMPRISING A MIXING DEVICE

(71) Applicant: Haldor Topsøe A/S, Kgs. Lyngby (DK)

(72) Inventor: Emir Zahirovic, Copenhagen (DK)

(73) Assignee: Topsoe A/S, Kgs. Lyngby (DK)

( * ) Notice: Subject to any disclaimer, the term of this patent is extended or adjusted under 35 U.S.C. 154(b) by 388 days.

(21) Appl. No.: 17/636,446

(22) PCT Filed: Aug. 19, 2020

(86) PCT No.: PCT/EP2020/073173
§ 371 (c)(1),
(2) Date: Feb. 18, 2022

(87) PCT Pub. No.: WO2021/037623
PCT Pub. Date: Mar. 4, 2021

(65) Prior Publication Data
US 2022/0280904 A1    Sep. 8, 2022

Related U.S. Application Data

(60) Provisional application No. 62/892,200, filed on Aug. 27, 2019.

(30) Foreign Application Priority Data

Oct. 17, 2019  (EP) ..................................... 19203741

(51) Int. Cl.
*B01J 8/04*    (2006.01)
*B01F 25/433*  (2022.01)
*B01F 101/00*  (2022.01)

(52) U.S. Cl.
CPC ......... *B01J 8/0492* (2013.01); *B01F 25/4331* (2022.01); *B01J 8/0453* (2013.01); *B01F 2101/2204* (2022.01); *B01J 2208/00849* (2013.01)

(58) Field of Classification Search
CPC .......... B01F 25/00; B01F 25/40; B01F 25/42; B01F 25/433; B01F 25/4331; B01F 2101/00; B01F 2101/2204; B01J 8/00; B01J 8/02; B01J 8/04; B01J 8/04446; B01J 8/0449; B01J 8/0453; B01J 8/0492; B01J 2208/00; B01J 2208/00796; B01J 2208/00823; B01J 2208/00831; B01J 2208/00849; B01J 2208/00938
See application file for complete search history.

(56) References Cited

U.S. PATENT DOCUMENTS

| | | | |
|---|---|---|---|
| 5,635,145 A | 6/1997 | Hartog et al. |
| 7,674,439 B2 | 3/2010 | Jacobs et al. |
| 8,017,095 B2 | 9/2011 | Kemoun et al. |
| 8,597,595 B2 | 12/2013 | Akin et al. |
| 2015/0328610 A1 | 11/2015 | Zahirovic et al. |

*Primary Examiner* — Natasha E Young
(74) *Attorney, Agent, or Firm* — Blank Rome LLP

(57) ABSTRACT

The present invention relates to multi-bed catalytic reactor with a cylindrical shape comprising a mixing device mounted between two catalyst beds in the reactor, said mixing device comprises connected pipe segments forming mixing section and discharging section.

16 Claims, 8 Drawing Sheets

MULTIPLE-BED CATALYTIC REACTOR COMPRISING A MIXING DEVICE

This application is a national stage application, under 35 U.S.C. § 371, of PCT/EP2020/073173, now WO 2021/037623, filed Aug. 19, 2019, which claims benefit of European Application No. EP19203741.4, filed Oct. 17, 2019, both of which are incorporated herein by reference in their entirety.

FIELD OF THE INVENTION

This invention relates to a reactor comprising a mixing device, specifically a multi-bed hydroprocessing reactor. Specifically, the mixing device is for use in down-flow catalytic reactors which include vertically superimposed packed beds of particulate catalytic material wherein a liquid, liquid and gas mixture or vapour is processed as it flows down through the packed beds. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC).

BACKGROUND OF THE INVENTION

Hydrocracking is a process for converting of heavy oil fractions to light oil fractions. Hydroprocessing is taking place in a hydroprocessing catalytic reactor which is the key element of a hydroprocessing unit. Hydroprocessing catalytic reactors can have single or multiple catalyst beds. Which of the options will be chosen for a particular reactor depends on the amount of catalyst is required for conversion of the feed to the product with desired properties. Most of the hydroprocessing reactions are exothermic and heat is developed as feed is passing through the catalyst bed. In order not to expose the catalyst to higher temperatures than required, and consequently to accelerate deactivation of the catalyst, the required volume of catalyst is divided into a number of beds with cooling zones (quench sections) installed between the beds. The cooling is achieved by introduction of cold hydrogen gas through the "quench pipe". Besides the cooling, the quench zone must achieve spatial uniformity of species/temperatures of the liquid phase leaving the section to the lover bed. For this purpose, a mixing chamber is installed in the section.

After the cooling and mixing stage the fluid must be distributed evenly on the catalyst of the bed below. For this purpose, distribution trays are installed below the mixing chamber and above the catalyst of the lower bed. In order to achieve the highest distribution quality, it must be assured that the distributor trays operate within own sensitivity limits. Distributor trays can operate as required as long as liquid depth on the tray is no more than 10 mm different from end to end of the tray Therefore, flow parameters of the fluid exiting the mixing chamber are often changed by different means and brought to the values required for the best performance of the distributor tray.

As it can be seen from the descriptions above the current organisation of the quench section consists from: quench pipe, mixing chamber, splash plate, rough cut tray (optional) and distributor tray. In some approaches the catalyst support grid, holding the catalyst of the higher bed, as well as the catalyst grid support beams are considered as a part of the quench section.

These elements are occupying lot of reactor space by own volume as well as free inter-element volume required to provide access to each of the elements for purpose of installation, un-installation, maintenance and cleaning of the elements.

The height of the quench section is the distance from the catalyst of lower bed to the catalyst of the bed above. The volume occupied by quench section is "inactive" reactor volume and decreasing this volume is paramount if increase of the active reactor volume is to be achieved. The space saved by decrease of the quench section height can be used for loading of the additional catalyst (revamp) or reduction of total reactor height (new reactors).

Known art mixers propose a solution to the problem of effective mixing and space requirements for the mixer. U.S. Pat. No. 8,017,095 discloses means to provide mixing of gas and fluids in a height constrained interbed space of a catalytic reactor without increasing pressure drop. In particular, the device improves the effectiveness of an existing mixing volume in mixing the gas phase and liquid phase of two-phase systems. According to U.S. Pat. No. 8,017,095, the mixing device helps create a highly arcuate flow to incoming effluents and a high degree of mixing within a constrained interbed space of a catalytic reactor.

Due to the installation, un-installation and maintenance requirements as well as for cleaning of all elements of the quench section it is crucial to provide enough space for full access to any of the elements. In order to minimise complexity of the work in the reactor it is necessary to enable convenient and fast opening/closing of all man-ways of all of the elements of the section.

US2015328610 discloses a mixing device mounted between two catalyst beds in a multi-bed catalytic reactor with a cylindrical shape. The mixing device has a circular outer rim which corresponds to the inner wall of the reactor and includes a collecting section for collecting fluid from an up-stream catalytic bed, a mixing section for mixing the collected fluid, and a discharging section for discharging the mixed fluid to a down-stream catalytic bed. The collecting section, the mixing section and the discharging section are disposed outside the centre of the circular cross-section of the reactor.

However, there is a need for an even more effective mixing device especially in situations where the fluid comprises both liquid and gas phases which challenges the mixing due to the influence of centrifugal and gravitational forces.

Therefore, a need exists to provide catalytic reactor with an improved efficient mixer which still occupies less reactor space, especially vertically, than known mixers, which mixes effectively with a limited pressure drop and which is simple, cost-effective to produce and if possible also can be integrated with other reactor internals to further save reactor space.

SUMMARY OF THE INVENTION

The present invention provides high efficiency mixing and redistribution while occupying minimal reactor volume and causing limited pressure loss. It comprises components made from readily available materials and can be easily installed, integrated with support beams and allows for access to the reactor internals through the centre.

The new multi-bed reactor with a cylindrical shape according to the invention comprises a mixing device for mixing fluids, the mixing device is mounted between two catalyst beds in the multi-bed catalytic reactor. The mixing device comprises at least one support beam, as well as support grid and divider plate. The support beam(s) supports the mixing device and the above catalyst bed via the support grid. The divider plate provides a division between the catalyst bed above and below the mixing device, forcing the process fluid flowing from the above catalyst bed to the below catalyst bed the flow through the mixing device to provide mixing and even distribution of the process fluid to the catalyst bed below the mixing device. The support beam(s) can be made of a plurality of tailored and assembled plates with apertures for weight saving and integration with the mixing device parts as well as other reactor internals. The support grid and the divider plate may both be made of sections for ease of installation in the catalytic reactor and service work. The sections can be assembled in any known way, such as using bolts, quick connections, slide connections, hinges etc.

The mixing device further comprises an inlet, a mixing section and a discharging section, all constructed from hollow and fluid connected elements to allow for a process fluid to flow from the catalyst bed section above the mixing device, through the inlet, further through the mixing section and out through the discharging section on to the catalyst bed section below the mixing device. The inlet, mixing section and discharging section comprise mechanically connected pipe segments. The pipe segments may be round, square or have any other cross-sectional shape which is best suited and most cost-effective manufactured. When connected, the pipe segments form at least one circular or spiral shape. By using pipe segments, it is possible to transfer the whole inlet, mixing and discharging section to the proper position in the catalytic reactor and assemble it there in a quick, cheap and easy fashion, as compared to known mixing devices. Furthermore, the pipe segments may be chosen from ready available pipes in standard sizes, which also lowers the price of the mixing device.

In an embodiment of the invention, the pipe segments comprise flanges and are assembled by means of the flanges. The flanges may serve the purpose of both assembling, but also mixing, i.e. the flanges may form internal edges into the pipe segments and these protrusions may enhance the mixing of the fluid flowing within the pipe segments. The protrusions may in an embodiment only be in the outer periphery of the inner surface of the pipe segments to enhance mixing of the liquid phases which primarily flows in the outer periphery with the gas phases, but at a low pressure drop since the inner periphery of the pipe segments remain flush and without protrusions. This effect may also be formed by a loose flange inserted in the assembly of two pipe segments, which is adapted and tailored to form protrusions as beneficial in each process application.

In a specific embodiment of the invention, the pipe segments have a circular cross-sectional area. The ends of the pipe segments are bended and may be cut at an angle at the ends, thus comprising flanges with an ellipsoid shape to fit the angled end cuts of the pipe segments. The angle may be between 1 and 89 degrees to the mid axis of the pipe segments. The discharging section may comprise a plurality of discharge vanes, which serve to guide and evenly distribute the process fluid exiting the discharging section.

In an embodiment, the inlet, the mixing section and the discharging sections form a shape of two concentric circles which are mechanically connected together by means of a spiral shaped connection section, which also provides fluid connection from the mixing section to the discharging section. To provide for easy access and service of the catalytic reactor, the inlet, mixing section and discharging section are disposed outside the centre one third of the circular cross-sectional area of the reactor, or even in one embodiment outside the centre half of the circular cross-sectional area of the catalytic reactor. This provides a large area in the centre of the mixing device where personnel can pass through, when also a central section of the divider plate and the support grid has been removed. This compact construction of the mixing device as described above, provides an embodiment of the invention where the mixing device has a height of less than 1 m, and for some smaller applications a height of less than 0.5 m with respect to the axial direction of the reactor.

To optimise the construction of the reactor and the one or more mixers within, the one or more mixing devices may form an integrated part of a catalyst bed support of the reactor. This has the advantage that the building-height of the entire construction may be reduced as compared to separate constructions of mixer and supports. Also, the material cost of the construction may be reduced. Accordingly, in an embodiment of the invention the mixing device has a height of less than 1 m, preferably less than 0.5 m with respect to the axial direction of the reactor.

A further embodiment of the invention is a method of mixing a fluid comprising a gas phase and a liquid phase and possibly a vapour phase, which is flowing inside a multi-bed catalytic reactor with a cylindrical shape, between an upper catalyst bed and a lower catalyst bed of the reactor. Said method is performed in a mixing device as described above, comprising at least one support beam, divider plate and support grid; and an inlet, a mixing section and a discharging section, which comprise a plurality of pipe segments which when connected have the shape of two concentric circles fluid-flow and mechanical connected by at least one spiral shaped pipe connection segment as described in the embodiments above.

In a first step of the process the cross-sectional area of the flow of fluid from the upper catalyst bed is constricted to an inlet by means of a divider plate, which blocks the cross-sectional area of the catalytic reactor, except for the inlet.

The collected fluid is then guided by the mixing device to flow in a tangential direction in the outer part of the circular mixer, in the mixing section and further to the discharging section. The process fluid is mixed while if flows within the mixing section and to some extent also in the discharging section. This is further enhanced by means of a plurality of flanges located at the ends of the pipe segments and where at least one of the flanges have an inner cross-sectional area which is smaller than the cross-sectional area of the pipe segments, thereby forming an inner edge within the pipe segments. In the final step of the process, the mixed process fluid is discharged to the lower catalyst bed in the discharging section which is disposed outside the centre of the circular cross-section of the reactor.

In a further embodiment of the invention the multi-bed catalytic reactor with a cylindrical shape and comprising a mixing device according to any of the embodiments as described above, is used for sulphur and nitrogen conversion (HDS/HDN), hydrogenation of olefins and aromatics, metals removal, oxygen conversion and hydrocracking.

Features of the Invention

1. A multi-bed catalytic reactor with a cylindrical shape comprising a mixing device mounted between two catalyst beds in said reactor, said mixing device comprises at least one support beam, support grid and divider plate and further comprising an inlet, a mixing section and a discharging section, wherein said inlet, mixing section and discharging section are adapted to convey a process fluid and comprise mechanically connected pipe segments, the segments form at least one circular or spiral shape when connected.

2. A multi-bed catalytic reactor with a cylindrical shape comprising a mixing device according to feature 1, wherein the at least one support beam supports the inlet, mixing section and discharging section as well as the at least one support grid and divider plate.

3. A multi-bed catalytic reactor with a cylindrical shape comprising a mixing device according to any of the preceding features, wherein the divider plate divides the reactor space above and below the divider plate, thereby forcing the process fluid to flow through the inlet, mixing section and discharging section when passing from the reactor space on one side of the divider plate to the reactor space on the other side of the divider plate, the divider plate comprises divider plate segments and at least one of the divider plate segments is releasable connected and thereby adapted to be removed for service of the multi-bed catalytic reactor.

4. A multi-bed catalytic reactor with a cylindrical shape comprising a mixing device according to any of the preceding features, wherein the at least one support beam is a laminated beam comprising connected beam plate segments, the divider plate is supported on top of the at least one support beam and the support grid is supported on top of the at least one support beam, above the divider plate, the support grid comprises support grid segments and at least one of the support grid segments is releasable connected and thereby adapted to be removed for service of the multi-bed catalytic reactor.

5. A multi-bed catalytic reactor with a cylindrical shape comprising a mixing device according to any of the preceding features, wherein said at least one support beam comprises apertures adapted to let the connected pipe segments pass through the at least one support beam, whereby the inlet, mixing section and discharging section are integrated supported by the at least one support beam.

6. A multi-bed catalytic reactor with a cylindrical shape comprising a mixing device according to any of the preceding features, wherein said pipe segments are mechanically connected by means of flanges located at each end of the pipe segments.

7. A multi-bed catalytic reactor with a cylindrical shape comprising a mixing device according to feature 6, wherein a plurality of said flanges have an inner cross-sectional area which is smaller than the inner cross-sectional area of the pipe segments the flanges are connected to, thereby forming inner edges in at least one of the inlet, mixing section and discharging section, to enhance mixing of the process fluid flowing in the inlet, mixing section and/or discharging section.

8. A multi-bed catalytic reactor with a cylindrical shape comprising a mixing device according to feature 7, wherein a plurality of said flanges forms an inner edge only located in the outer half part of the circular or spiral shape, when seen in the direction of the process fluid flow within the pipe segments.

9. A multi-bed catalytic reactor with a cylindrical shape comprising a mixing device according to any of the preceding features, wherein a loose flange is arranged between at least two of the pipe segments, said loose flange has an inner cross-sectional area than the inner cross-sectional area of the at least two of the pipe segments.

10. A multi-bed catalytic reactor with a cylindrical shape comprising a mixing device according to any of the features 6-9, wherein flanges have an ellipsoid shape, the pipe segments have a circular cross-sectional shape and a plurality of the pipe segment ends are cut at an angle between 1 and 89 degrees to the mid axis of said pipe segments.

11. A multi-bed catalytic reactor with a cylindrical shape comprising a mixing device according to any of the preceding features, wherein the discharging section comprises a plurality of discharge vanes.

12. A multi-bed catalytic reactor with a cylindrical shape comprising a mixing device according to any of the preceding features, wherein the inlet, mixing section and discharging sections form a shape of two concentric circles which are mechanical and fluid flow connected by a spiral shaped pipe connection segment.

13. A multi-bed catalytic reactor with a cylindrical shape comprising a mixing device according to feature 1, wherein the inlet, mixing section and discharging section are disposed outside the centre one third of the circular cross-sectional area of the reactor, preferably outside the centre half of the circular cross-sectional area of the reactor.

14. A multi-bed catalytic reactor with a cylindrical shape comprising a mixing device according to any of the preceding features, wherein the mixing device further comprises a quench inlet for adding a quench fluid to the process fluid, said quench inlet is disposed in the inlet, the mixing section or the discharging section.

15. A multi-bed catalytic reactor with a cylindrical shape comprising a mixing device according to any of the preceding features, wherein the mixing device has a height of less than 1 m, preferably less than 0.5 m with respect to the axial direction of the reactor.

16. A method of mixing a process fluid comprising a gas phase and a liquid phase and possibly a vapour phase and flowing inside a multi-bed catalytic reactor with a cylindrical shape between an upper catalyst bed and a lower catalyst bed thereof, said method is performed in a mixing device comprising at least one support beam, divider plate and support grid; and an inlet, mixing section and discharging section which comprise a plurality of pipe segments which when connected have the shape of two concentric circles fluid-flow and mechanical connected by at least one spiral shaped pipe connection segment, the method comprising the steps of,
  constricting the cross-sectional area of the flow of fluid from the upper catalyst bed to the inlet by means of the divider plate
  flowing the process fluid within the mixing section and the discharging section in a circular and spiral direction,
  mixing the process fluid while it is flowing in the pipe segments, by means of a plurality of flanges located at the ends of the pipe segments, at least one of the flanges have an inner cross-sectional area which is smaller than the cross-sectional area of the pipe segments, thereby forming an inner edge within the pipe segments
  discharging the mixed process fluid to the lower catalyst bed while it is flowing in the discharging section disposed outside the centre of the circular cross-section of the reactor.

17. Use of a multi-bed catalytic reactor with a cylindrical shape comprising a mixing device according to any of the features 1-15 for sulphur and nitrogen conversion (HDS/

HDN); hydrogenation of olefins and aromatics, metals removal, oxygen conversion or hydrocracking.

BRIEF DESCRIPTION OF THE DRAWINGS

The invention is further illustrated by the accompanying drawings showing examples of embodiments of the invention.

POSITION NUMBERS

01. Mixing device.
02. Inlet.
03. Mixing section.
04. Discharging section.
05. Pipe segment.
06. Flange.
07. Support beam.
08. Support grid.
09. Divider plate.
10. Pipe connection segment.

DESCRIPTION OF THE DRAWINGS

A number of embodiments of the invention will be explained in more detail in the following, with reference to the drawings.

Figure 1:
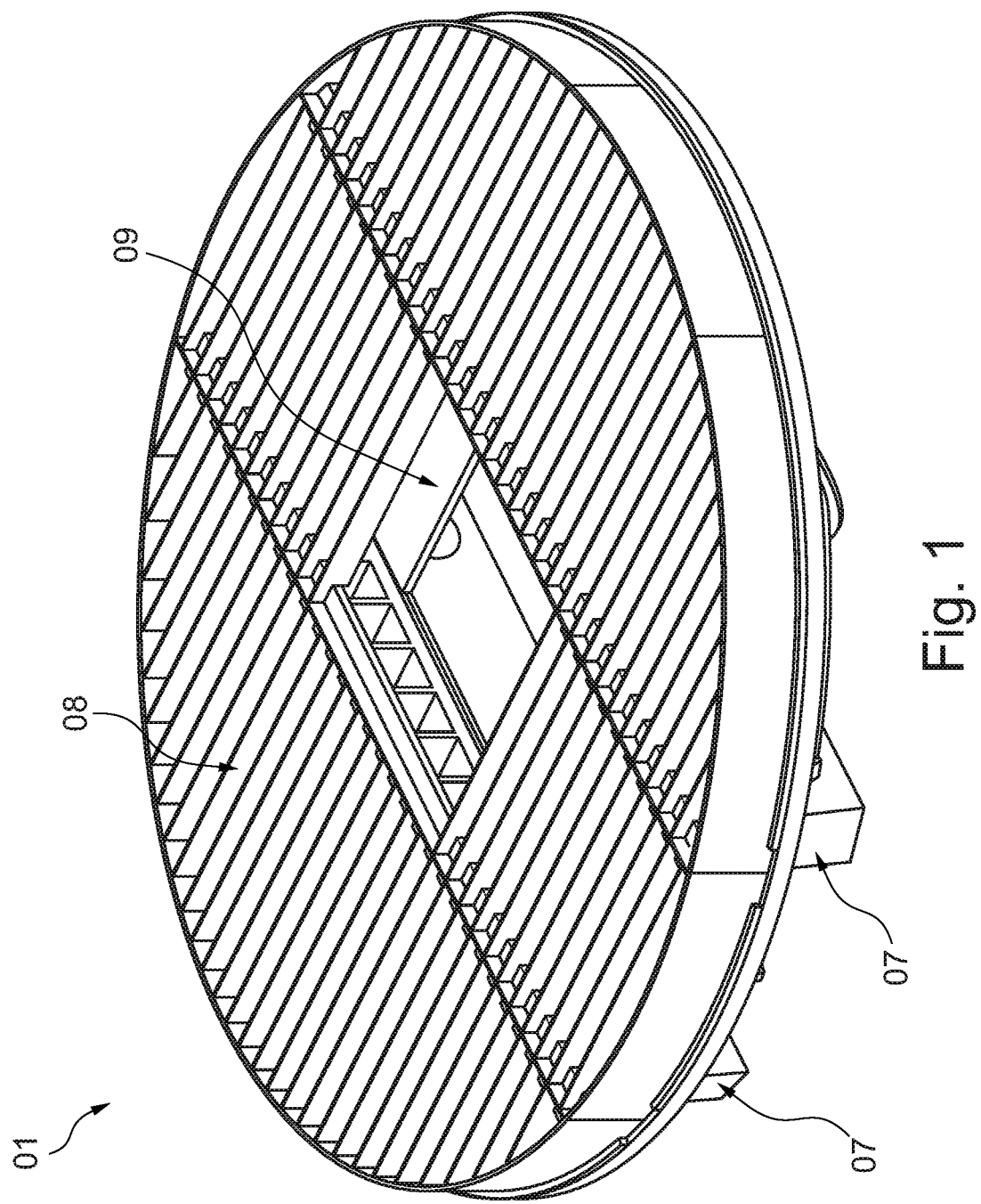
FIG. 1 shows an isometric top view of a part of the mixing device in a multi-bed catalytic reactor (not shown) according to an embodiment of the invention.

The isometric view presented in FIG. 1 shows a top/side view of a part of the mixing device 01 comprised between catalytic beds in a multi-bed catalytic reactor (not shown). The mixing device has a circular shape to correspond the inner circular wall of the cylindrical reactor wherein the mixing device is to be installed. The support grid 08 which supports the above catalytic bed (not shown) is covering the upper part of the mixing device, only a central part of the support grid is removed in FIG. 1, illustrating how the support grid is made of segments which can be removed to provide space for service. This is also the case for the underlying divider plate 09. A part of the two support beams 07 can be seen.

Figure 2:
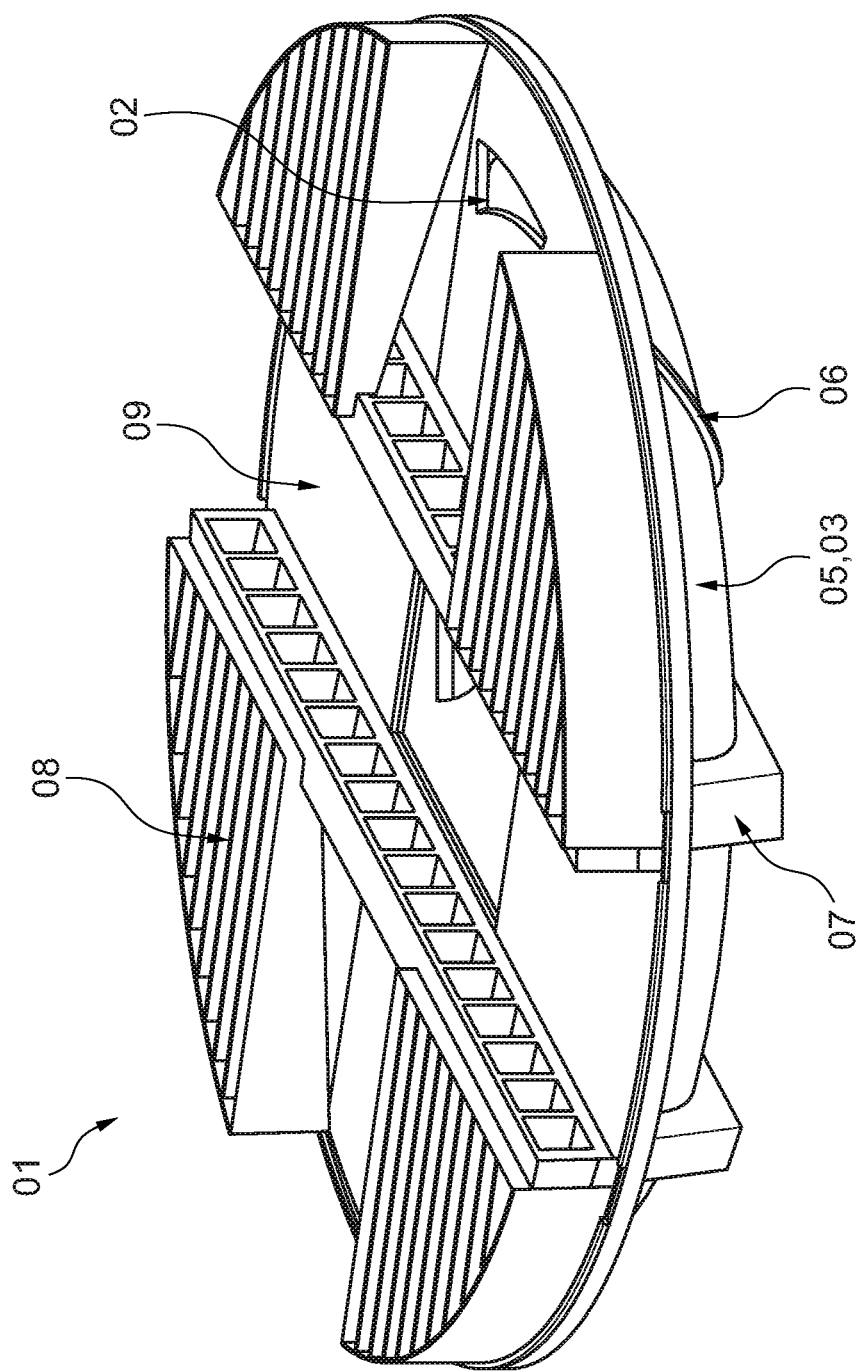
FIG. 2 shows an isometric top view of a part of the mixing device in a multi-bed catalytic reactor (not shown) according to an embodiment of the invention.

More support grid segments have been removed in FIG. 2 which reveals more of the divider plate. Here it is more clearly seen how the divider plate fluidly seals the upper catalytic bed from the catalytic bed below the mixing device, forcing essentially all the process fluid to flow through the inlet 02 and further through the mixing section 03 before it is evenly distributed to the catalytic bed below the mixing device (it is to be understood that during installation the central hole will be covered by a segment of the divider plate). A small part of the mixing section can be seen, already showing how the mixing section is made from pipe segments 05, which are mechanically connected by flanges 06, providing a fluid tight connection of all the pipe segments.

Figure 3:
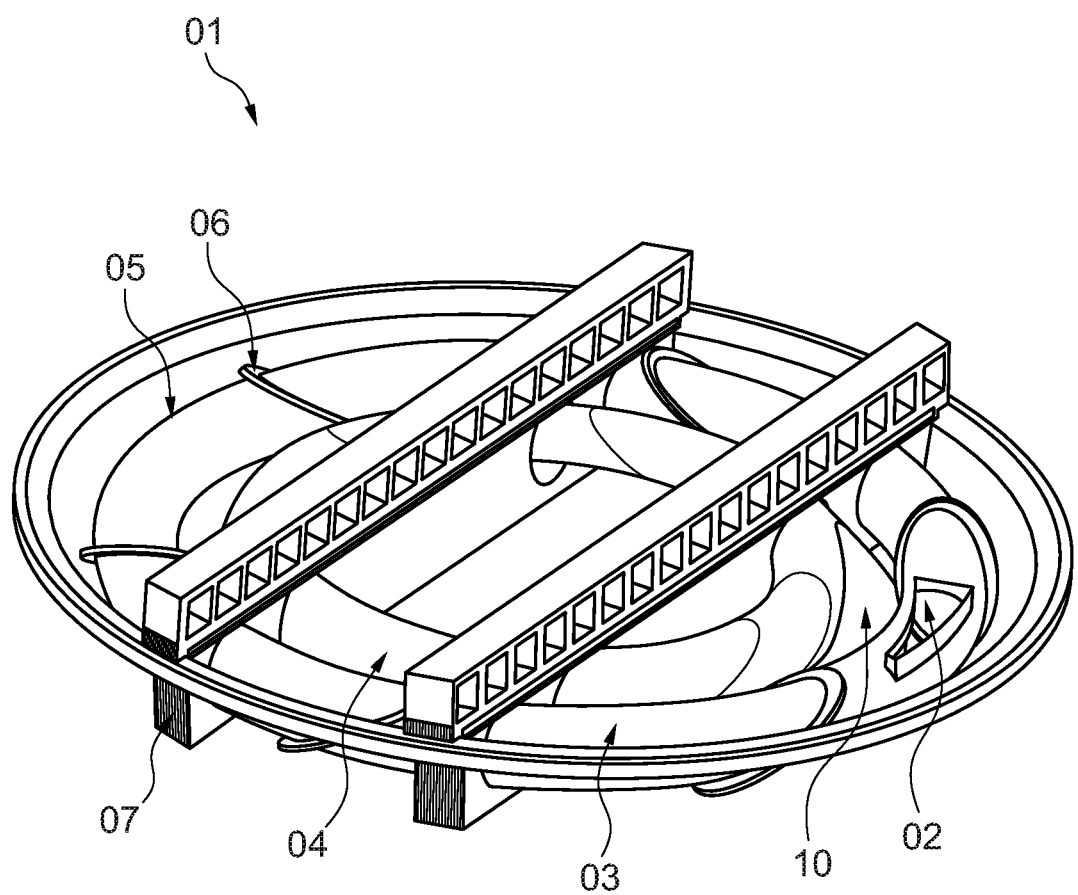
FIG. 3 shows an isometric top view of a part of the mixing device in a multi-bed catalytic reactor (not shown) according to an embodiment of the invention.
Figure 4:
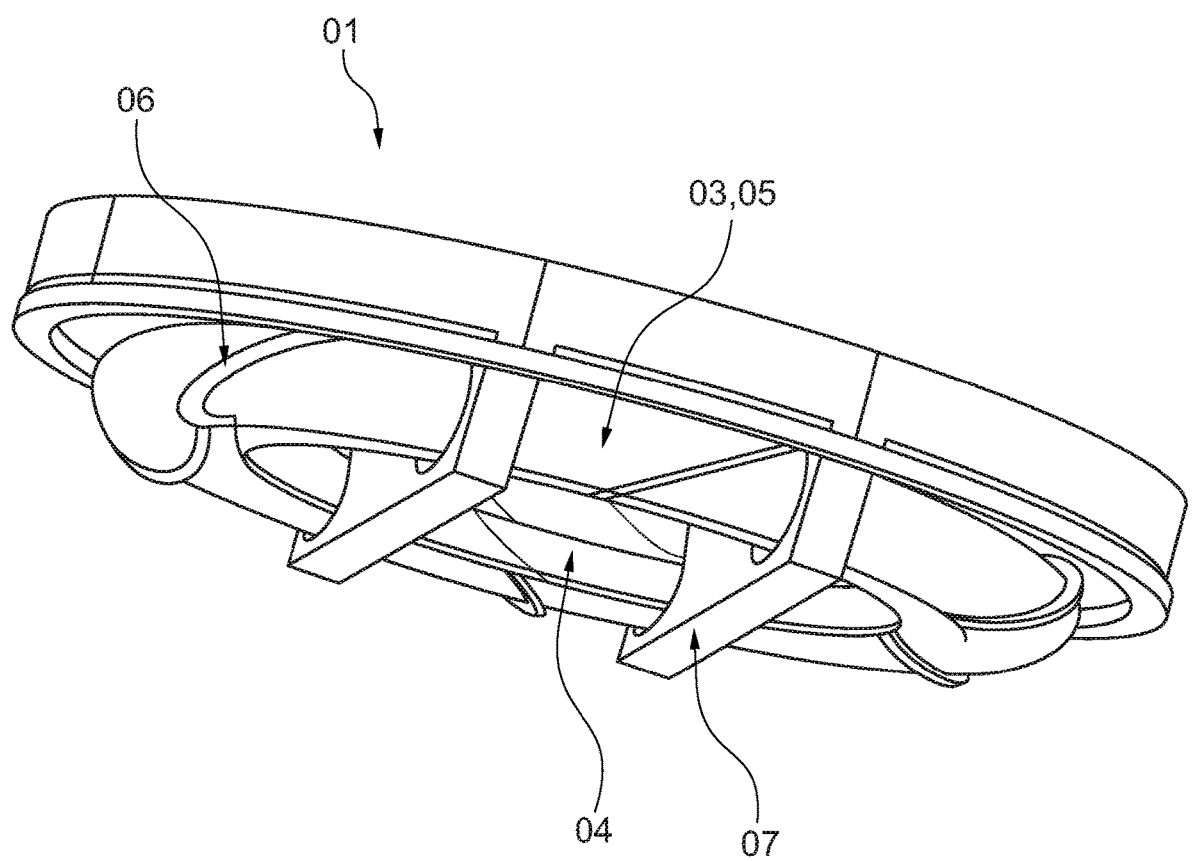
FIG. 4 shows an isometric side/bottom view of the mixing device in a multi-bed catalytic reactor (not shown) according to an embodiment of the invention.
Figure 5:
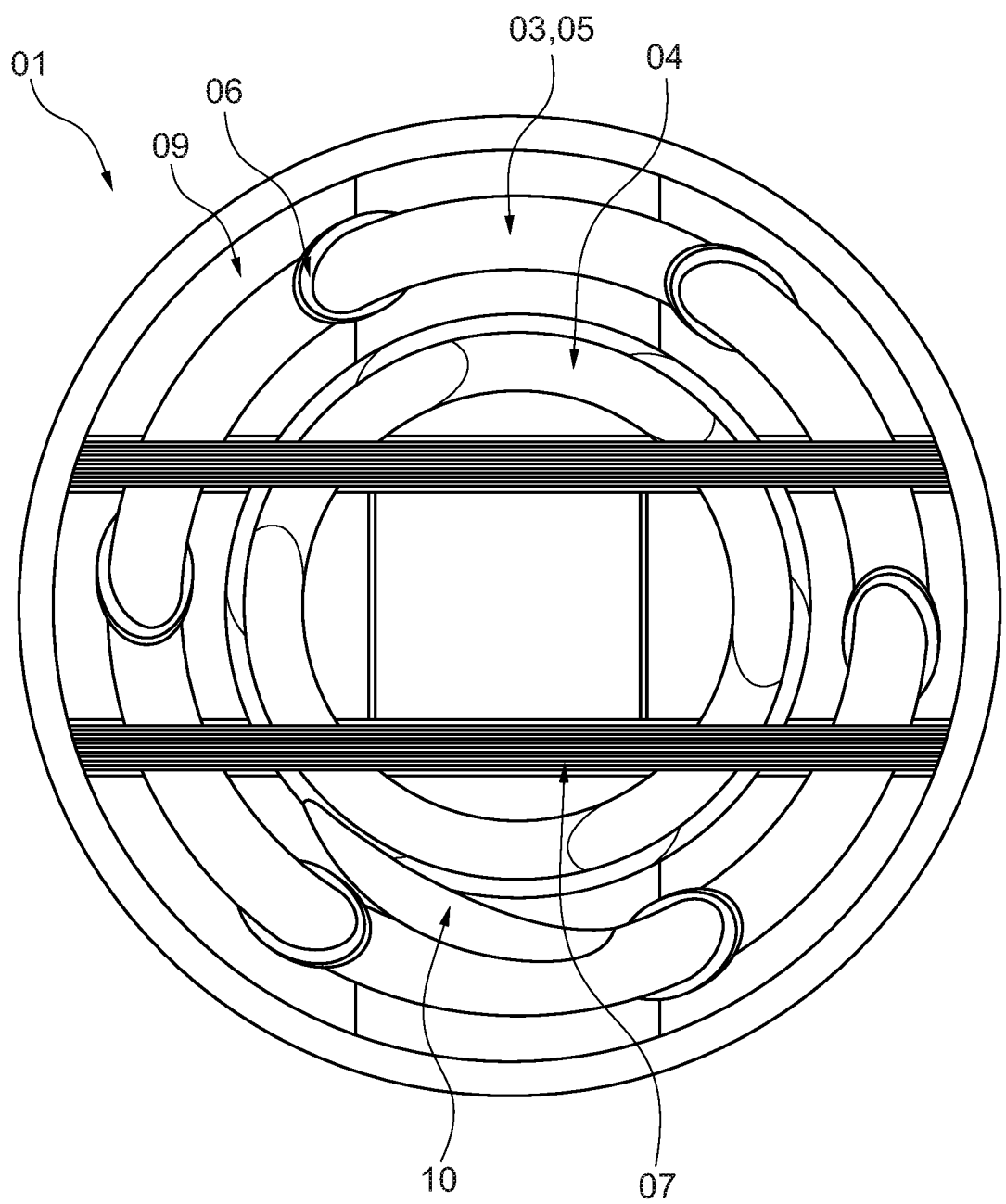
FIG. 5 shows s bottom view of the mixing device in a multi-bed catalytic reactor (not shown) according to an embodiment of the invention.

In FIG. 3, the mixing device has been stripped of all the divider plate and support grid-segments, reviling all the connected pipe segments as well as most of the support beams. It can be seen how this embodiment of the invention comprises two concentric circles of pipe segments which are connected by a spiral shaped pipe connection segment 10. The outer circle is the mixing section, and the inner circle is the discharging section 04. Again, imagining that the divider plate fluidly seals off the upper catalyst bed from the lower catalyst bed, the process fluid flow will come from the upper catalyst bed, in through the inlet, perform a circular motion in the mixing section, where the fluid which may comprise gas, liquid and vapour phase is mixed, then it flows on to the discharging section (the inner circle) through the pipe connection segment and is evenly distributed on to the lower catalyst bed. It can be seen from the drawing how the mixing and discharging-section is integrated into the support beams through apertures in the support beams, which minimizes the space taken from the catalytic reactor by the mixing device, while still providing good mixing and redistribution with a minimized pressure loss. This is also seen in FIG. 4 and FIG. 5, where further the opening at the total inner circumference of the discharging section is visible, which provides the exit for the process fluid further to the below catalyst bed. This opening may comprise guide vanes (not shown) which enhances the even distribution of the fluid and also stabilizes the discharging section.

Figure 6:
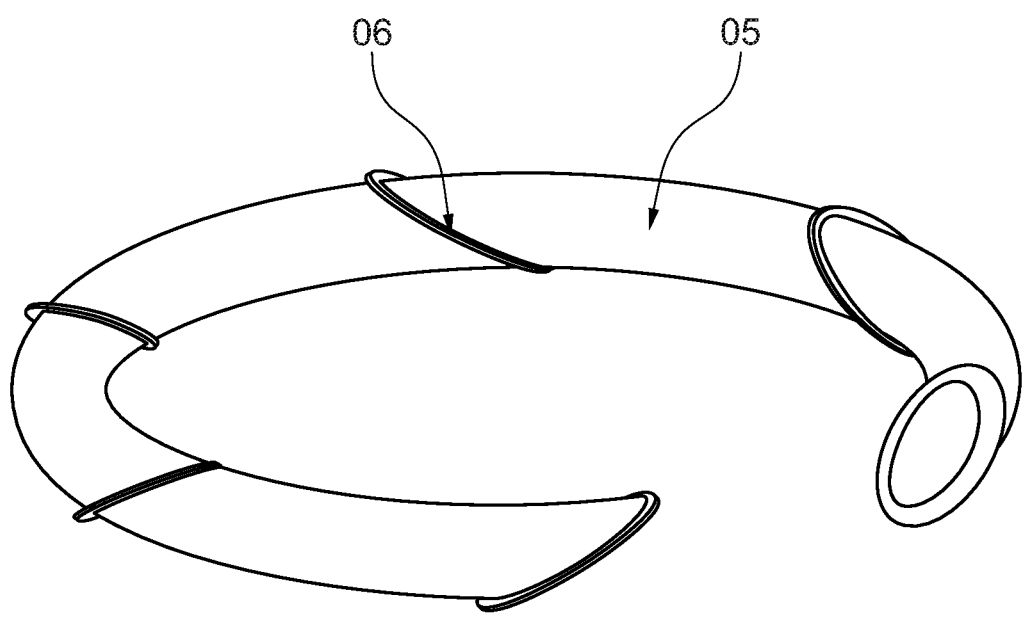
FIG. 6 shows a side/top view of a part of the mixing device in a multi-bed catalytic reactor (not shown) according to an embodiment of the invention.
Figure 7:
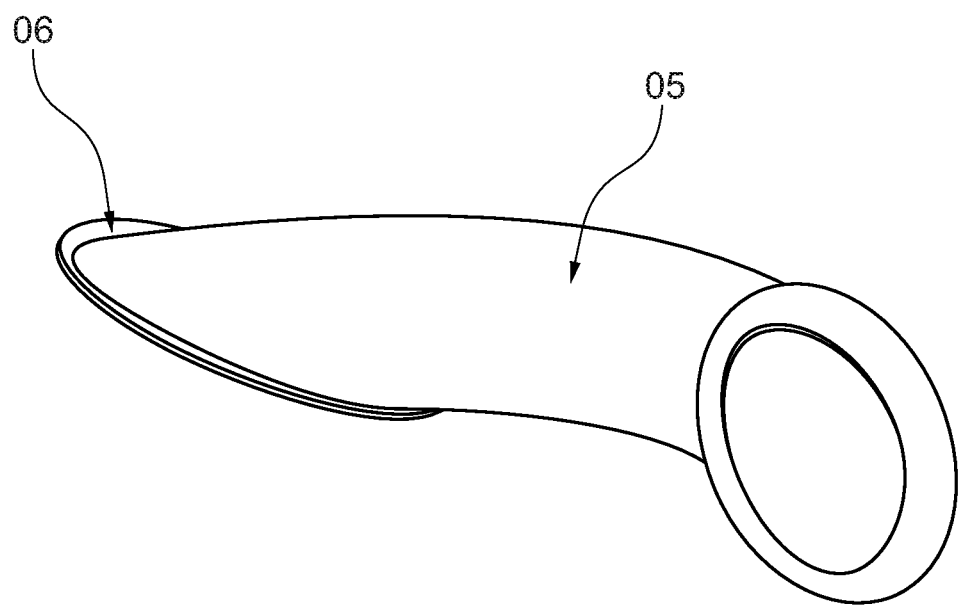
FIG. 7 shows a side/top view of a part of the mixing device in a multi-bed catalytic reactor (not shown) according to an embodiment of the invention.
Figure 8:
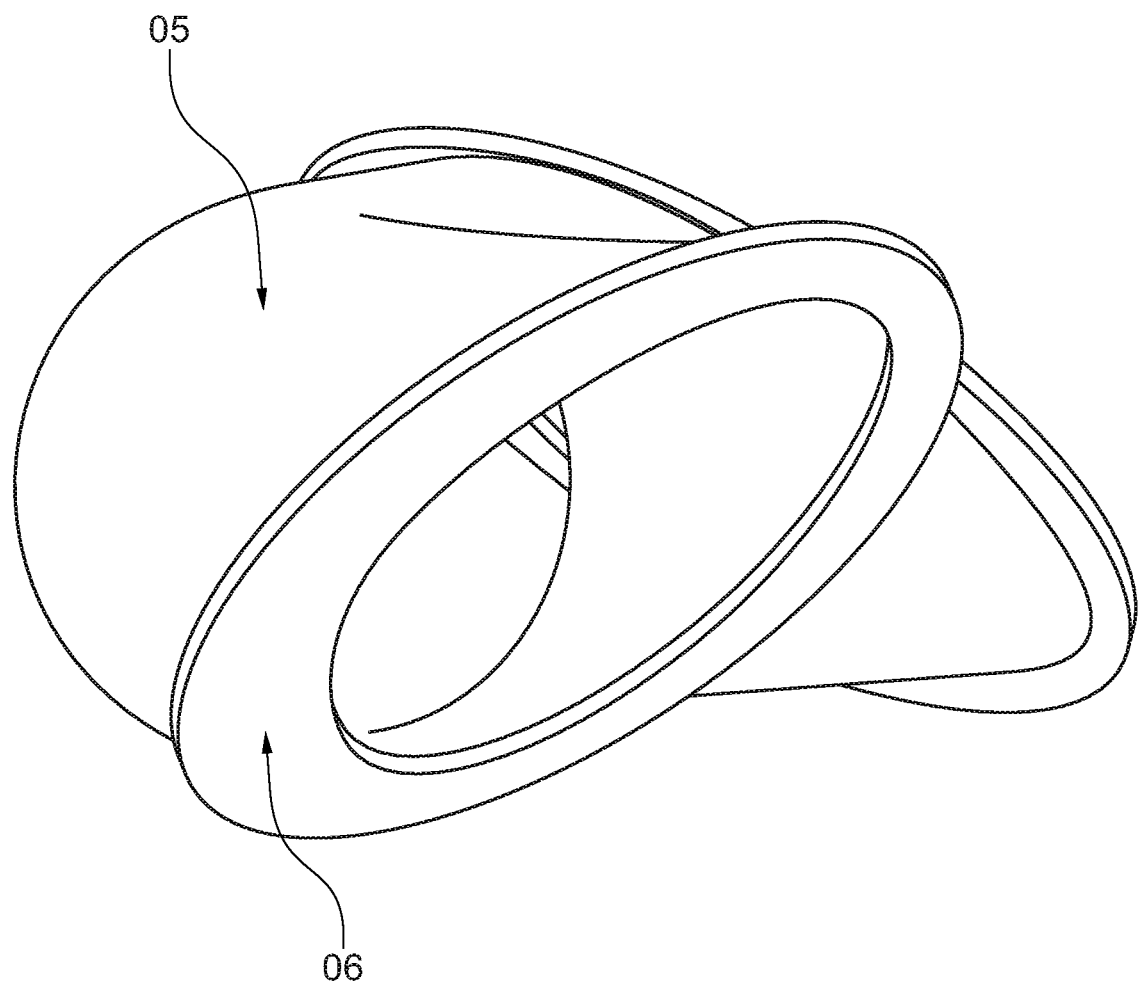
FIG. 8 shows an additional view of a part of the mixing device in a multi-bed catalytic reactor (not shown) according to an embodiment of the invention.

In the shown embodiment, the pipe segments are cut at an angle different from 90 degrees relative to the pipe segment axis. In this way the flanges which may have inwards protruding edges may enhance mixing of the fluid within the mixing section with a modest pressure drop. The pipe segment assembly and the angled ellipsoid shaped flanges are shown in more detail in FIG. 6, FIG. 7 and FIG. 8. It is to be understood that the flanges may have holes for mechanical connection and that gaskets may be provided between the flanges. In an embodiment, the flanges may protrude inwardly only at the outer circumference of the mixing section.

EXAMPLE

The new mechanical construction is based on bent tubes. The bent tubes are not adjacent to each other and to the support ring and thus they can have flanges at the extremities. Full flanges facilitate the connection between two tubes. The flanges can be opportunely shaped (ellipsoidal, and broad rimmed) to achieve process functionalities described later.

The tubes are supported through independent beams, which also support a plate at the top—which ensures that all gas and liquid are collected through the inlet of the mixing chamber. The top plate is flat (very simple construction). The beams rest on the support ring and they support the flat top and the tubes. The only significant welds of the construction are the connection between the flanges and the bent pipes.

The full flanges have a smaller diameter than the tubes, and they can be shaped such to deliver an anti-segregation function. The beams are obtained by riveting together multiple thin metal plates. (The plates are so thin that the holes accommodating the tubes can be laser cut). The catalyst support and the mixer is integrated by this solution. The catalyst support beams are often very large and dimensioned for a very large total load. There may be very little or no additional extra load to take into consideration if the same beams shall support the mixer as well. The new beams have an upper part embedded in the grids, and giving a flat surface for catalyst loading, and a lower part supporting the mixer.

The quench section is ideally shorter than the known solutions, since it eliminates the empty space between catalyst support and mixer, and it offers flexibility as to the mixer geometry. Furthermore, it offers a flat catalyst support surface towards the ceramic balls/catalyst.

Effects and Advantages

1: Reliable and simpler installation
2: Removal of all structural welds—Cheap manufacturing
3: Space reduction and easier catalyst loading

The invention claimed is:

1. A multi-bed catalytic reactor with a cylindrical shape comprising a mixing device mounted between two catalyst beds in said reactor, said mixing device comprises at least one support beam, support grid and divider plate and further comprising an inlet, a mixing section and a discharging section, wherein said inlet, mixing section and discharging section are adapted to convey a process fluid and comprise mechanically connected pipe segments, the segments form at least one circular or spiral shape when connected.

2. A multi-bed catalytic reactor with a cylindrical shape comprising a mixing device according to claim 1, wherein the at least one support beam supports the inlet, mixing section and discharging section as well as the at least one support grid and divider plate.

3. A multi-bed catalytic reactor with a cylindrical shape comprising a mixing device according to claim 1, wherein the divider plate divides the reactor space above and below the divider plate, thereby forcing the process fluid to flow through the inlet, mixing section and discharging section when passing from the reactor space on one side of the divider plate to the reactor space on the other side of the divider plate, the divider plate comprises divider plate segments and at least one of the divider plate segments is releasable connected and thereby adapted to be removed for service of the multi-bed catalytic reactor.

4. A multi-bed catalytic reactor with a cylindrical shape comprising a mixing device according to claim 1, wherein the at least one support beam is a laminated beam comprising connected beam plate segments, the divider plate is supported on top of the at least one support beam and the support grid is supported on top of the at least one support beam, above the divider plate, the support grid comprises support grid segments and at least one of the support grid segments is releasable connected and thereby adapted to be removed for service of the multi-bed catalytic reactor.

5. A multi-bed catalytic reactor with a cylindrical shape comprising a mixing device according to claim 1, wherein said at least one support beam comprises apertures adapted to let the connected pipe segments pass through the at least one support beam, whereby the inlet, mixing section and discharging section are integrated supported by the at least one support beam.

6. A multi-bed catalytic reactor with a cylindrical shape comprising a mixing device according to claim 1, wherein said pipe segments are mechanically connected by means of flanges located at each end of the pipe segments.

7. A multi-bed catalytic reactor with a cylindrical shape comprising a mixing device according to claim 6, wherein a plurality of said flanges have an inner cross-sectional area which is smaller than the inner cross-sectional area of the pipe segments the flanges are connected to, thereby forming inner edges in at least one of the inlet, mixing section and discharging section, to enhance mixing of the process fluid flowing in the inlet, mixing section and/or discharging section.

8. A multi-bed catalytic reactor with a cylindrical shape comprising a mixing device according to claim 7, wherein the plurality of said flanges forms an inner edge only located in the outer half part of the circular or spiral shape, when seen in the direction of the process fluid flow within the pipe segments.

9. A multi-bed catalytic reactor with a cylindrical shape comprising a mixing device according to claim 1, wherein a loose flange is arranged between at least two of the pipe segments, said loose flange has an inner cross-sectional area than the inner cross-sectional area of the at least two of the pipe segments.

10. A multi-bed catalytic reactor with a cylindrical shape comprising a mixing device according to claim 6, wherein the flanges have an ellipsoid shape, the pipe segments have a circular cross-sectional shape and a plurality of the pipe segment ends are cut at an angle between 1 and 89 degrees to the mid axis of said pipe segments.

11. A multi-bed catalytic reactor with a cylindrical shape comprising a mixing device according to claim 1, wherein the discharging section comprises a plurality of discharge vanes.

12. A multi-bed catalytic reactor with a cylindrical shape comprising a mixing device according to claim 1, wherein the inlet, mixing section and discharging sections form a shape of two concentric circles which are mechanical and fluid flow connected by a spiral shaped pipe connection segment.

13. A multi-bed catalytic reactor with a cylindrical shape comprising a mixing device according to claim 1, wherein the inlet, mixing section and discharging section are disposed outside the center one third of the circular cross-sectional area of the reactor.

14. A multi-bed catalytic reactor with a cylindrical shape comprising a mixing device according to claim 1, wherein the mixing device further comprises a quench inlet for adding a quench fluid to the process fluid, said quench inlet is disposed in the inlet, the mixing section or the discharging section.

15. A multi-bed catalytic reactor with a cylindrical shape comprising a mixing device according to claim 1, wherein the mixing device has a height of less than 1 m with respect to the axial direction of the reactor.

16. A method of mixing a process fluid comprising a gas phase and a liquid phase and possibly a vapor phase and flowing inside a multi-bed catalytic reactor with a cylindrical shape between an upper catalyst bed and a lower catalyst bed thereof, said method is performed in a mixing device comprising at least one support beam, divider plate and support grid; and an inlet, mixing section and discharging section which comprise a plurality of pipe segments which, when connected, have the shape of two concentric circles fluid-flow and mechanically connected by at least one spiral shaped pipe connection segment, the method comprising the steps of:
- constricting the cross-sectional area of the flow of fluid from the upper catalyst bed to the inlet by means of the divider plate,
- flowing the process fluid within the mixing section and the discharging section in a circular and spiral direction,
- mixing the process fluid while it is flowing in the pipe segments, by means of a plurality of flanges located at the ends of the pipe segments, at least one of the flanges have an inner cross-sectional area which is smaller than the cross-sectional area of the pipe segments, thereby forming an inner edge within the pipe segments, and
- discharging the mixed process fluid to the lower catalyst bed while it is flowing in the discharging section disposed outside the centre of the circular cross-section of the reactor.

* * * * *